Figure 1:
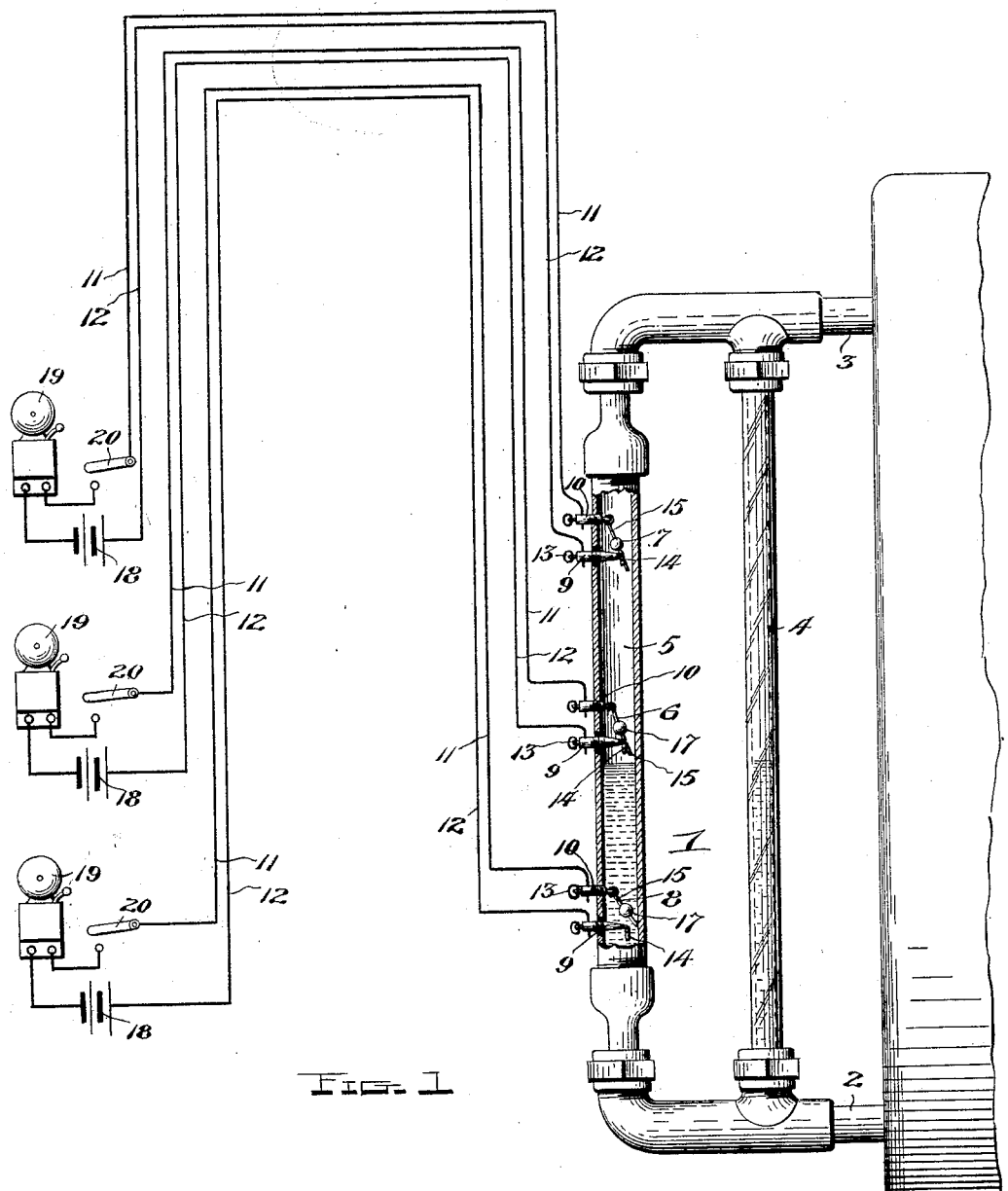

No. 705,421. Patented July 22, 1902.
H. MOORE.
WATER LEVEL TESTING DEVICE FOR BOILERS.
(Application filed Dec. 9, 1901.)
(No Model.) 2 Sheets—Sheet 1.

Witnesses
Inventor
H. Moore
By H. B. Willson & Co.
Attorneys

No. 705,421. Patented July 22, 1902.
H. MOORE.
WATER LEVEL TESTING DEVICE FOR BOILERS.
(Application filed Dec. 9, 1901.)
(No Model.) 2 Sheets—Sheet 2.
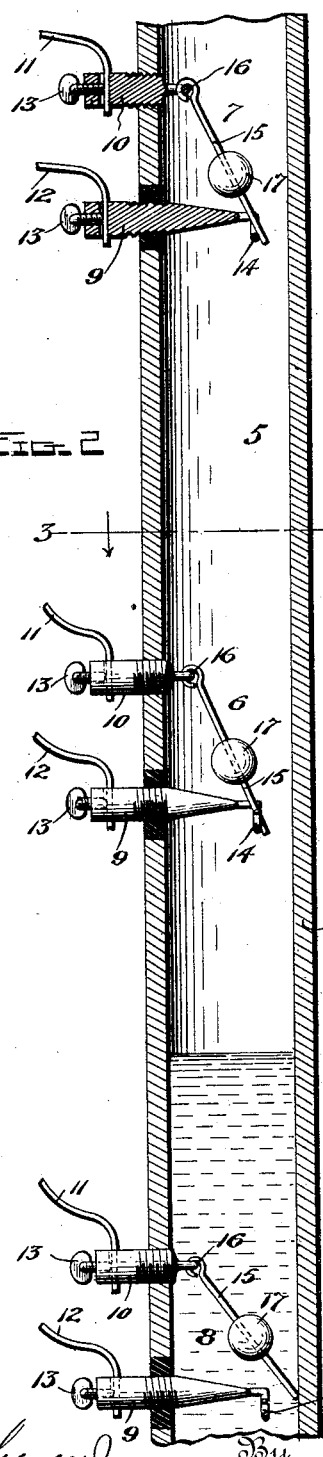
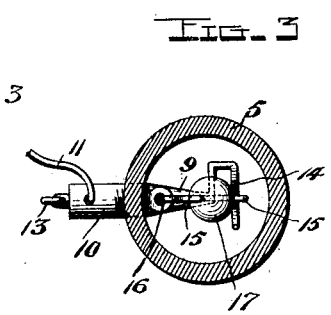
Inventor
H. Moore

UNITED STATES PATENT OFFICE.

HERMAN MOORE, OF MOUNDSVILLE, WEST VIRGINIA.

WATER-LEVEL-TESTING DEVICE FOR BOILERS.

SPECIFICATION forming part of Letters Patent No. 705,421, dated July 22, 1902.

Application filed December 9, 1901. Serial No. 85,263. (No model.)

*To all whom it may concern:*

Be it known that I, HERMAN MOORE, a citizen of the United States, residing at Moundsville, in the county of Marshall and State of West Virginia, have invented certain new and useful Improvements in Water-Level-Testing Devices for Boilers; and I do declare the following to be a full, clear, and exact description of the invention, such as will enable others skilled in the art to which it appertains to make and use the same.

This invention relates to means whereby the height of the water within a steam-boiler may be ascertained by the engineer at a point remote from the boiler.

The object of the invention is to provide simple and effective electrical means for carrying out the prime purpose of the invention in an efficient and practical manner.

The device embodies a water-gage having contacts connected thereto, one of said contacts being provided with a float to rise with the water and break the circuit, and circuit connections including a bell and an open switch, which may be arranged in the engineer's office at a point more or less remote from the boiler, so that the engineer by closing said switch may determine whether or not the water is at the height for which the device is set, the closing of the switch having no effect upon the bell if the water is at the proper height, but causing the sounding of the bell if the water is below said height, as the circuit will be completed by the engagement of the contact upon the falling therebelow of the column of water.

In the present instance I have shown the use of three of such devices mounted so as to enable the engineer to determine by test whether the water is at the normal point or above or below the normal point.

With the foregoing and other objects in view, which will readily appear as the nature of the invention is better understood, the same consists in certain novel features of construction and combination and arrangement of parts, which will be hereinafter fully described, defined in the appended claims, and illustrated in the accompanying drawings, in which—

Figure 1 is a sectional view of the water-gage and a diagram of the alarm and circuit connections of the invention. Fig. 2 is a detail view of the contacts on an enlarged scale, the gage-tube appearing in vertical section. Fig. 3 is a sectional plan view on the line 3 3 of Fig. 2.

Referring now more particularly to the drawings, the numeral 1 represents a water-gage comprising the conducting-pipes 2 and 3 and the glass gage-tube 4 and having also an auxiliary gage-tube 5, extending parallel with said tube 4. The purpose of the tube 4 is to subserve the ordinary function of a gage to enable the fireman or others in close proximity to the boiler to ascertain the height of the water therein. The tube 5 is preferably made of metal and serves as a container for an additional column of water, which by rising and falling in said tube causes the operation of the bell-circuit connections, whereby the engineer in his office, at a point more or less remote from the boiler, may ascertain the level of the water in said boiler.

Connected to the tube 5 are three sets of local-circuit-closing devices, (denoted, respectively, 6, 7, and 8,) the first, 6, being arranged at the normal-level point, the second, 7, at the high-water point, and the third, 8, at the low-water-level point. Each of these devices comprises conducting-plugs 9 and 10, extending through the wall of the tube and suitably fixed thereto, said plugs being suitably apertured at their outer ends for the passage of the circuit-wires 11 and 12, which are connected thereto by binding-screws 13. The plugs 9, as shown, are illustrated from the wall of the tube.

The plug 9 is provided at its inner end with a contact-piece 14, which is in the form of a hook adapted to act as a guide for a coacting contact-piece 15, carried by the superposed plug 10. The contact-piece 15 is in the form of a rod or stem pivoted at one end, as indicated at 16, to said plug 9 and having its free end arranged to move in the arc of a circle, in which the contact-piece 14 of the plug 9 lies. The stem 15 carries a float 17, which is adapted to rise and fall with the water contained within the tube 5 and to thereby move the said stem or contact-piece 15 into and out of engagement with the contact-piece 14. As the stem 15 descends by the lowering of the water within the tube and comes into engagement with the upper portion of the contact-piece 14 the latter guides the stem in its downward movement, thus effecting a perfect engagement between said contacts and preventing the stem from moving out of its proper path of travel.

Each of the local-circuit-closing devices above described is arranged in an electrical circuit, including the wires 11 and 12, a battery 18, a bell 19, and a switch 20. The battery may be arranged at any suitable point, while the bell and switch are located in or adjacent to the office of the engineer, which may be at any desired distance from the boiler. The switch 20 normally remains open and is adapted to be closed by the engineer to enable him to determine whether the local-circuit-closing devices attached to the tube and coöperating therewith are in contact, which will be determined by the sounding of the bell, thus indicating that the water in the boiler is at a certain level.

In the operation of the apparatus as the water rises and falls within the tube 5 the floats 17 rise and fall therewith, thus bringing the two contacts of each local-circuit-closing device out of or into engagement. When the water is at the normal point, the contact-pieces 15 of the two local-circuit-closing devices 6 and 8 will be held out of contact with the contact-pieces 14 thereof, while the contact-piece 15 of the local-circuit-closing device 7 will be in engagement with its coöperating contact-piece 14. When the parts are thus arranged and the switches 20 in the circuits of the devices 6 and 8 are closed, the bells connected therewith will not sound, because the circuits will be broken, as the contact-points 15 will be held out of engagement with the contact-points 14 by the action of the water on the floats 17; but when the switch 20, in circuit with the local-circuit-closing devices 7, is closed the bell will sound, as the two contacts 14 and 15 will be in engagement, thus indicating to the engineer that the water is below the high-water level and at the normal level. When the water falls below the normal level, the bells connected with the two circuit-closing devices 6 and 7 will sound upon the closing of the coöperating switches 20; but the bell connected with the circuit-closing device 8 will not sound if the water is not below the low-water point, for the reason that the float will maintain the contact 15 out of engagement with the contact 14. When the water falls below the low-water level, all the bells will sound upon the closing of the switches 20, thus indicating to the engineer that the water-level in the boiler is below the low-water point.

From the foregoing description, taken in connection with the accompanying drawings, it is thought that the construction, mode of operation, and advantages of my improved water-level-testing device for boilers will be readily apparent without requiring a more extended explanation.

Various changes in the form, proportion, and the minor details of construction may be resorted to without departing from the principle or sacrificing any of the advantages of this invention.

Having thus described the invention, what is claimed, and desired to be secured by Letters Patent, is—

1. In a device of the character described, the combination with a gage-tube; of local-circuit-closing connections attached thereto and comprising plugs having binding-posts for the attachment of the circuit-wires, one of said plugs being provided with a contact-piece forming a guide and the other with a pivoted contact-piece carrying a float, an electric circuit including the conducting-wires connected with said plugs, a bell in said circuit, and a normally open switch also in said circuit, substantially as specified.

2. In a device of the character described, the combination of a main gage-tube, an auxiliary gage-tube, connections between said tubes, local-circuit-closing devices mounted upon the auxiliary tube and having contacts thrown into and out of engagement by the rise and fall of the water in said tube, an electric circuit in which the said local-circuit-closing devices are included, a bell also included in said circuit, and a switch which is normally open and which is adapted to be closed to indicate by the sounding or non-sounding of the bell the position of the said local-circuit-closing devices and the level of the water within said tube, substantially as described.

3. In a water-level-testing appliance for steam-boilers, the combination with a gage-tube; of local-circuit-closing connections attached thereto and comprising plugs, one of said plugs having a contact-piece carrying a float and movable toward and from the other plug, an electric circuit in which the said local-circuit-closing devices are included, a bell in said circuit, and a switch also in said circuit and adapted to be closed to indicate by the sounding or non-sounding of the bell the position of the local-circuit-contact connections and the level of the water in the tube, substantially as specified.

In testimony whereof I have hereunto set my hand in presence of two subscribing witnesses.

HERMAN MOORE.

Witnesses:
J. R. UNDERDONK,
J. B. SHANNON.